T. S. DISSTON.
INSERTABLE SAW-TEETH.
No. 189,199. Patented April 3, 1877.
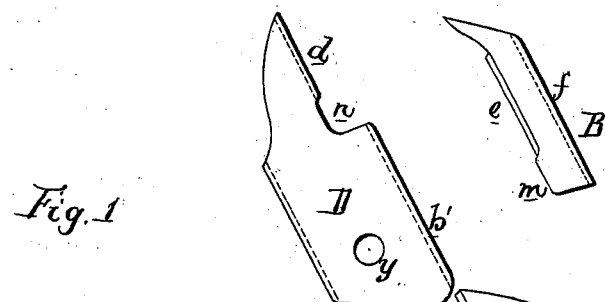
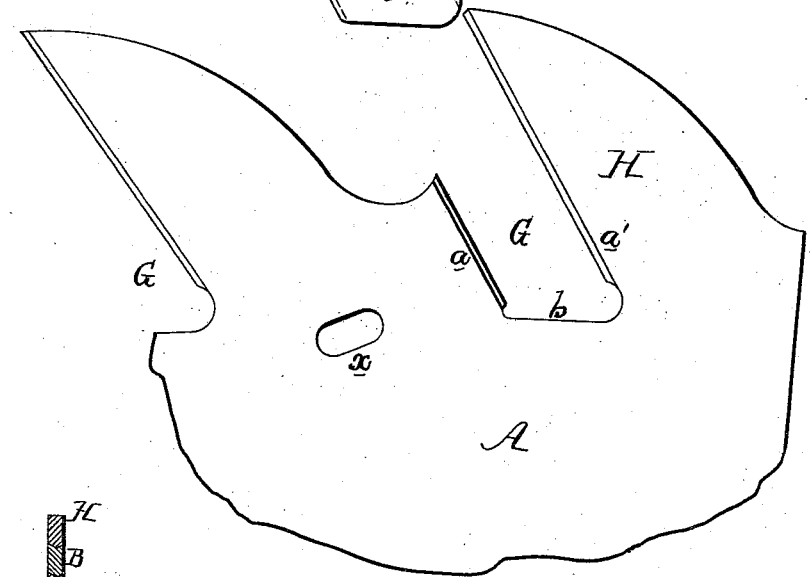
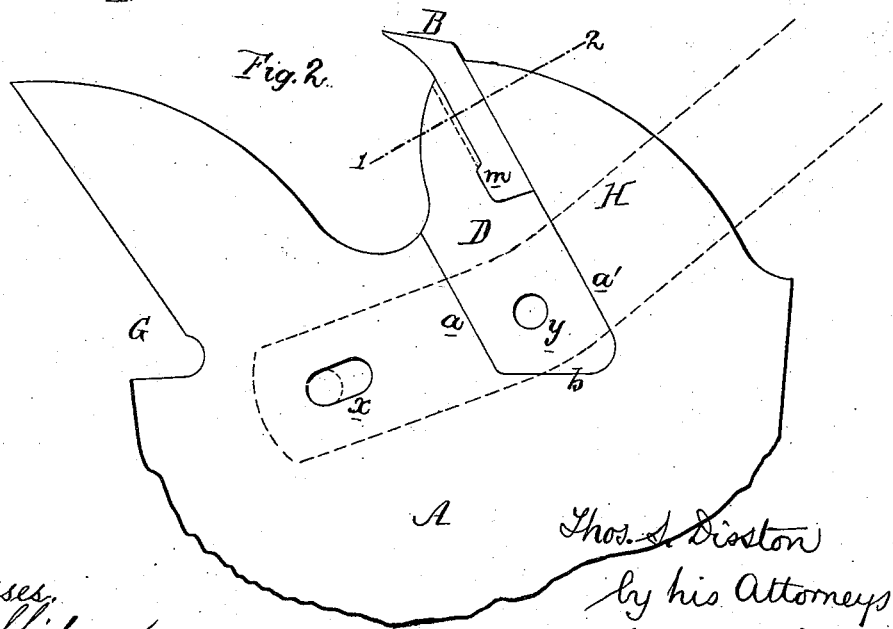

UNITED STATES PATENT OFFICE.

THOMAS S. DISSTON, OF PHILADELPHIA, PENNSYLVANIA, ASSIGNOR TO HENRY DISSTON, HAMILTON DISSTON, ALBERT H. DISSTON, AND HORACE C. DISSTON, OF SAME PLACE.

IMPROVEMENT IN INSERTIBLE SAW-TEETH.

Specification forming part of Letters Patent No. 189,199, dated April 3, 1877; application filed September 4, 1876.

*To all whom it may concern:*

Be it known that I, THOMAS S. DISSTON, of Philadelphia, Pennsylvania, have invented an Improvement in Insertible Saw-Teeth, of which the following is a specification:

The object of my invention is to so lock detachable teeth to the blade of a saw that the truth of the latter will not be affected by the introduction of the teeth.

In the accompanying drawing, Figure 1 is a view illustrating my improvements, and showing the several parts detached from each other; Fig. 2, the same as Fig. 1, showing the parts in their proper position; and Fig. 3 a section on the line 1 2.

A represents part of a circular saw-blade, B the steel cutting bit or tooth, and D the locking-plate.

In the blade of the saw are a series of recesses, G, each recess being bounded by the front edge $a$, rear edge $a'$, and the bottom edge $b$, the rear edge $a'$ being formed on the backing projection H.

In the present instance, each recess is inclined in respect to a radial line drawn through the center of the blade, but it may occupy different positions, providing its opposite edges $a$ $a'$ are parallel, so that the locking-plates, and teeth may be pushed into the recesses without imparting that distension to the outer portion of the saw-blade which would be the result of the driving of a wedge-formed tooth into a tapering recess.

The edges $a$ $a'$ of each recess have V-shaped ribs adapted to similarly-shaped grooves, on the opposite parallel edges of the locking-plate D, and a portion of this plate is cut away for the reception of the tooth B, which has at one end a proper cutting-edge and at the opposite end a projection, $m$, adapted to a recess, $n$, on the locking-plate.

The front edge $e$ of the tooth has a V-shaped rib, adapted to a similarly-shaped groove in the edge $d$ of the locking-plate, and the V-shaped groove in the rear edge $f$ of the tooth forms a continuation of the rear $b'$ of the locking-plate, and, like the latter, is adapted to the rib on the edge $a'$ of the backing projection.

When the several parts are in place, as shown in Fig. 2, the bit cannot be removed without first withdrawing, or partially withdrawing, the locking-plate from the recess, and the tooth is firmly held laterally at the back edge by the rib on the edge $a'$ of the recess, and in front by the groove in the edge $d$ of the locking-plate.

The lever for introducing the locking-plate and tooth into their places is shown by dotted lines in Fig. 2. This lever has two projecting pins, one for passing through a hole, $x$, in the blade, the other being adapted to a hole, $y$, in the locking-plate.

In order that the inner pin on the lever may accommodate itself to the course which the locking-plate must follow, as determined by the parallel edges $a$ $a'$, when the locking-plate is introduced into or withdrawn from the recess G, I make the hole $x$ elongated, as shown, or the hole in the locking-plate, or both holes, may, if desired, be elongated, so that the lever can be operated with proper effect.

It will be observed that my present improvement is allied to that for which Letters Patent No. 178,123 were granted to me on the 30th day of May, 1876, in which, however, the edges of the locking-plate and the corresponding edges of the recess in the blade are made on curved lines, whereas the edges of the plate and recess are straight in the present invention—a plan which is easier to carry into effect and insures a more accurate and tighter fit than that described in the said patent.

I claim as my invention—

1. The combination of the blade A and its recess, having straight and parallel opposite edges, with the locking-plate D and tooth B, adapted to the said locking-plate and recess, all substantially as set forth.

2. The blade A and its hole $x$, in combination with the locking-plate and its hole $y$, one or both of the holes being elongated, as and for the purpose specified.

In testimony whereof I have signed my name to this specification in the presence of two subscribing witnesses.

THOS. S. DISSTON.

Witnesses:
HENRY HOWSON, Jr.,
HUBERT HOWSON.